May 28, 1968 R. V. DE LEO ETAL 3,385,095
CHECKOUT DEVICE FOR FLUID DATA SENSORS
Filed March 14, 1966 2 Sheets-Sheet 1
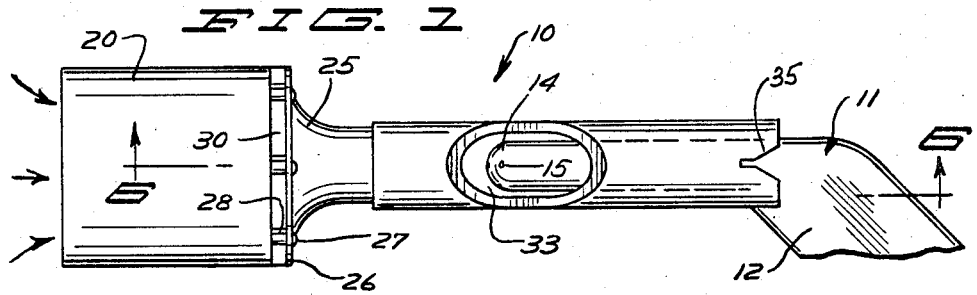
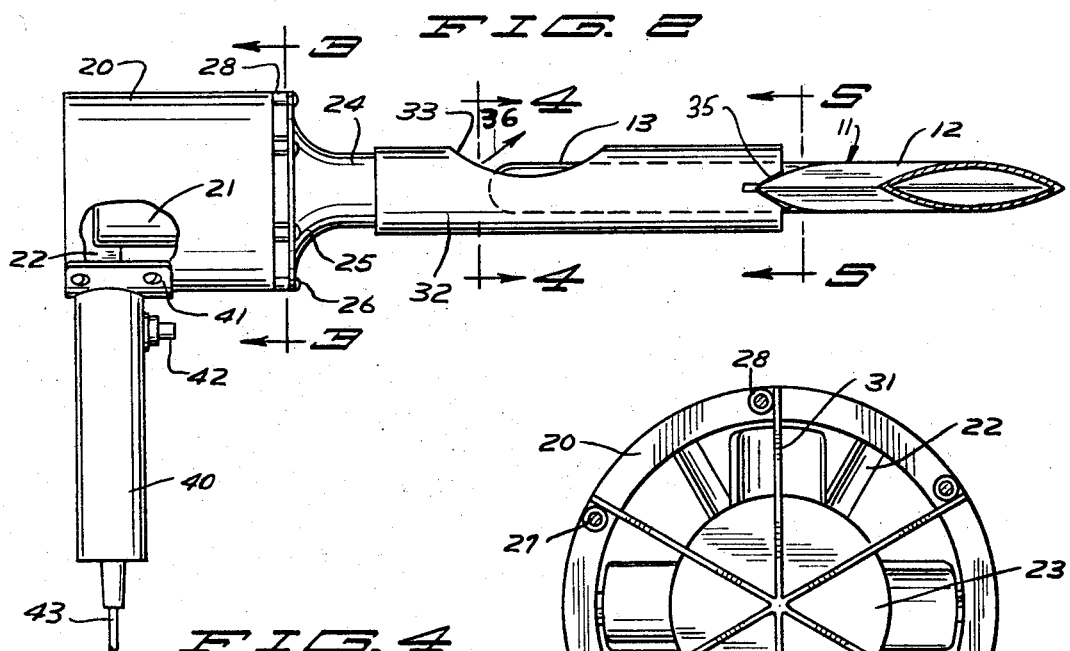
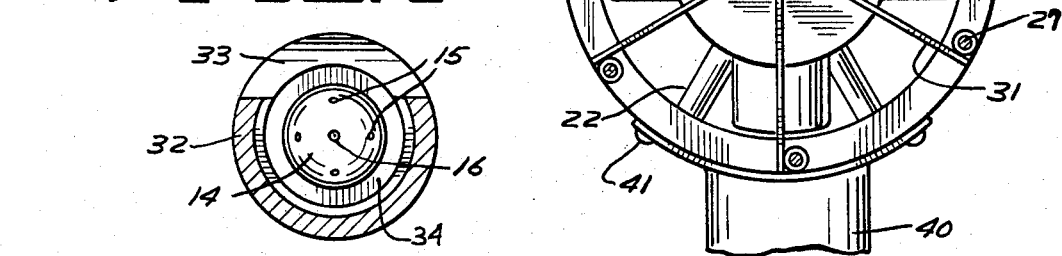
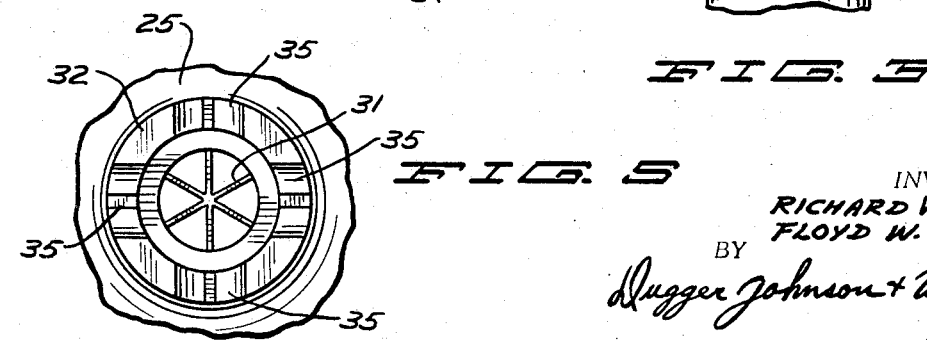
INVENTORS
RICHARD V. DELEO
FLOYD W. HAGEN
BY
Dugger Johnson + Westman
ATTORNEYS

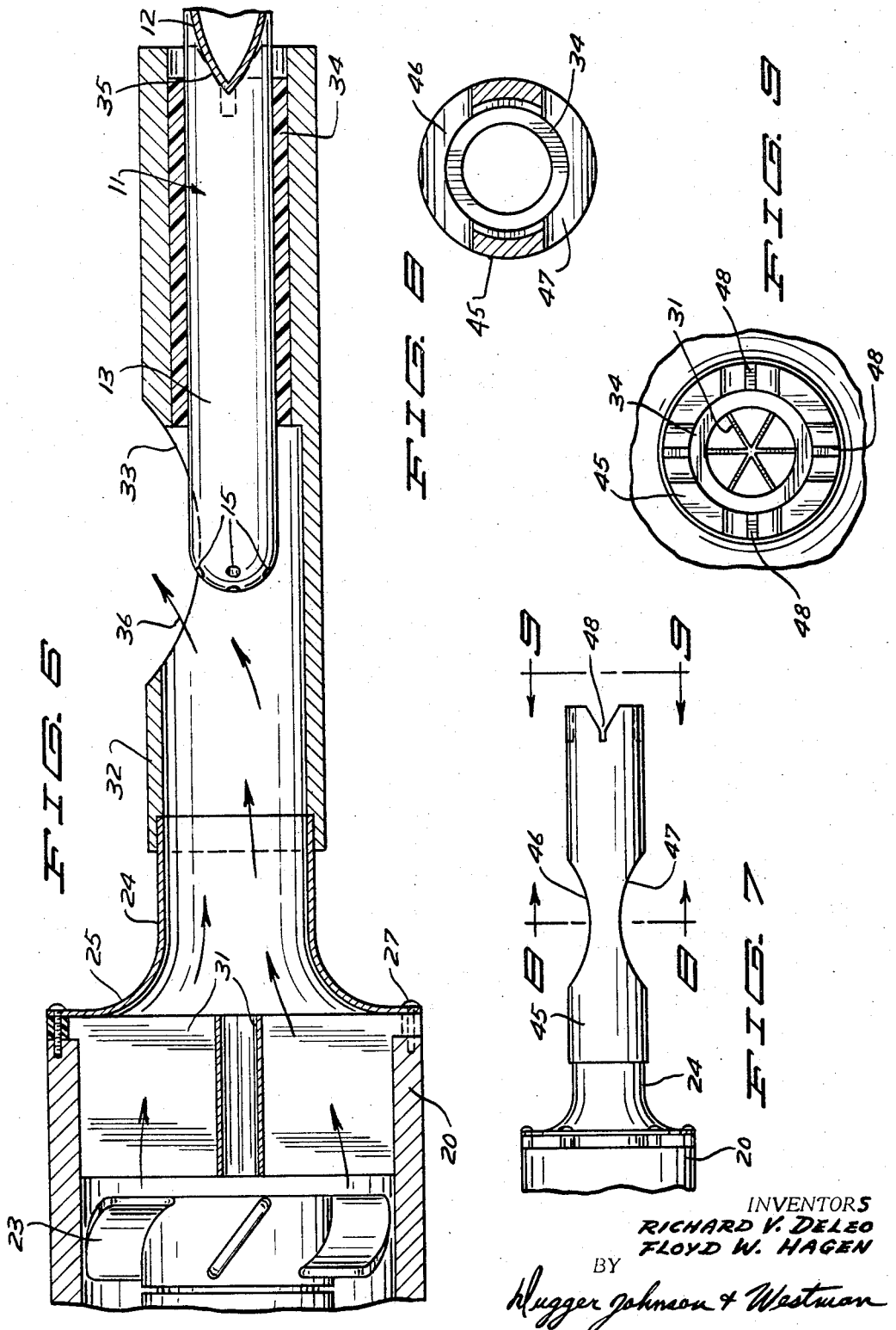

United States Patent Office 3,385,095
Patented May 28, 1968

3,385,095
CHECKOUT DEVICE FOR FLUID
DATA SENSORS
Richard V. De Leo, Hopkins, and Floyd W. Hagen,
Minneapolis, Minn., assignors to Rosemount Engineering Company, Minneapolis, Minn., a corporation of Minnesota
Filed Mar. 14, 1966, Ser. No. 534,031
13 Claims. (Cl. 73—4)

ABSTRACT OF THE DISCLOSURE

A check out device for fluid data sensors including a member for receiving the sensor, and means for providing a fluid flow through the member in a preselected relationship to the sensing ports on the sensor so that the operation of the sensor can be checked without removing it from its mounting. The unit is a portable hand-held device having a fan for providing the fluid flow and which can be plugged into an electrical outlet for power.

The present invention has relation to fluid data sensors and more particularly to a device which will permit an operator to quickly check fluid data sensors to make sure they have not been damaged, do not have leaks, and do not have any other malfunctions.

Air data or fluid data sensors on aircraft, in particular, are vulnerable to physical damage. The sensor protrudes directly out into the fluid stream, and can easily be struck by small particles of dirt, rock and sand, and on aircraft they can be bumped against by personnel servicing the aircraft.

While the sensors are usually constructed to be very rugged and able to take the normal amount of abuse, there are times when the edges of the ports in the sensor or probe will become damaged or the tubes will spring leaks or get plugged.

At the present time there is no way to quickly check out such sensors to insure that there has been no damage and that the sensor is working properly. Further, there is no way to calibate the sensor to make sure that the sensor, its lines and connected instruments are reading properly.

The device of the present invention is a small handheld unit which, as shown, includes a motor driven fan for creating a fluid stream, a conduit or duct for carrying the fluid stream, and means for positioning the fluid data sensor or probe to be checked properly with respect to the fluid stream. As shown, the duct has at least one outlet opening through which the fluid or air will flow, and the sensor is positioned aligned with the outlet opening so that the flow of fluid through the outlet opening will pass across the port to be checked. Modifications include means for providing fluid discharge in different directions from the duct so that when a multi-orifice sensing head is used, more than one sensor port can be checked at the same time. The device is easily adapted and modified to fit particular sensors and this can usually be done by changing the size of the duct or tunnel through which the fluid is passed and properly positioning the stop means on the duct so that the probe is stopped in proper position to have a flow of fluid across the port on the sensor that is being checked.

It is therefore an object of the present invention to present a handheld portable device for checking operation of fluid data sensors and the connected readout equipment.

It is a further object of the present invention to present a checkout device for fluid data sensors which can be used for calibrating the sensor and its readout instruments.

It is another object to present an easily used checkout device for air data sensors mounted on aircraft.

It is a further object of the present invention to present a fluid data sensor checkout device which provides high veolcity fluid flow over the sensing ports on the sensor.

Other objects are inherent in the specification and will become apparent as the description proceeds.

In the drawings,

FIG. 1 is a top plan view of a checkout device for fluid data sensors made according to the present invention shown in place on such a sensor;

FIG. 2 is a side elevational view of the device of FIG. 1;

FIG. 3 is an enlarged sectional view taken as on line 3—3 in FIG. 2;

FIG. 4 is a sectional view taken as on line 4—4 in FIG. 2;

FIG. 5 is a sectional view taken as on line 5—5 in FIG. 2 with the fluid data sensor removed for the sake of clarity;

FIG. 6 is a fragmentary enlarged sectional view taken as on line 6—6 in FIG. 1;

FIG. 7 is a side elevational view of a modified form of the device of the present invention showing two discharge openings therein;

FIG. 8 is a sectional view taken as on line 8—8 in FIG. 7; and

FIG. 9 is an end view taken as on line 9—9 in FIG. 7.

Referring to the drawings and the numerals of reference thereon, a fluid data sensor checkout device illustrated generally at 10 is shown in FIG. 1 installed on a fluid or airdata sensor 11, which is installed on an aircraft, (not shown). The term airdata sensor is used in the example, but it is to be understood that the checkout device will work for sensors in other fluids. The sensor 11 has a mounting strut 12 which has a cross section as shown in FIG. 2. The strut is tapered outwardly from a leading edge and then back to a trailing edge. A tubular probe portion 13 extends in direction facing the air stream. The probe portion has a hemispherical leading end surface 14 in which a plurality of angle sensing ports illustrated generally at 15 (FIG. 4) are provided. The ports 15 open through suitable conduits to suitable instrumentation (not shown). The angle sensing ports 15 have axes at acute angles with respect to the probe axis. An axial port 16 is open through the end surface as well and its axis lies along the axis of the probe portion 13.

The checkout device 10 includes a main housing 20 which is tubular as shown, and in which a fan motor 21 is mounted on suitable brackets 22 to the walls of the housing. The fan motor 21 drives a fan blade assembly 23 that is attached directly to the output shaft of the motor. The fan blade assembly will take in air through the open rear portions of the housing (the air intake can be designed as desired) and will direct the air forwardly toward a throat portion 24. The throat portion 24 is, as shown, reduced in cross section from the housing 20 and has a tapered entry portion 25 ending in a flange 26 which is attached to the housing through suitable screws 27. Spacers 28 are provided over the screws 27 to space the flange 26 from the housing. This gives an opening 30 around the periphery of the unit between the end of the housing and the flange.

A plurality of radial substantially flat vanes 31 are positioned in the housing between the fan blades 23 and the throat portion. The vanes 31 act as "flow straighteners" to cause the air flow coming from the fan 23 to stop swirling and become linear and axial with the throat axis.

Likewise, the opening 30 is to provide for a means for by-passing additional air to prevent cavitation of the fan blades.

The fan is designed to rotate at extremely high speeds. Thus a high velocity air flow is provided, and unless adequate intake means are provided there will be cavitation or "stalling" of the blades. The air flow would be reduced substantially if this occurred.

The throat portion 24 is attached to a tubular cylindrical housing 32 that is co-axial with the fan and the throat. The housing 32 provides an open centered duct in which the air is carried. As shown in FIGS. 1–6, the duct has an inlet opening at the throat and an outlet opening 33 in one side wall thereof. The outlet opening is made by forming a part cylindrical notch through the wall of the tube. The notch is formed about an axis at right angles to the axis of the probe.

A bushing 34 made of a low friction material is positioned inside the duct adjacent the remote or outer end of the duct. This bushing 34 is of size to fit snugly around the probe portion 13 of the airdata sensor. Notches illustrated generally at 35 are provided in the wall of the duct at the outer end of the housing. The notches are defined by tapered surfaces which are of size to engage the outer surfaces of the strut portion 12 of the airdata sensor and these surfaces provide stop means to properly position the hemispherical surface 14 in relation to the outlet opening 33. The probe portion 13 effectively plugs the remote end of the duct when it is in place.

The notches 35 are also positioned in a known relation to the longitudinal plane bisecting the opening 33 in the tubular member 32. As shown, there are four notches 35 positioned at 90° to each other. Also, as shown, there are four angle sensing ports 15. Thus with one outlet opening 33, as shown in FIG. 1, each of the angle sensing ports can be checked by seating each of the notches 35 at the end of the tubular member sequentially onto the strut.

A high velocity of air flow is provided across the sensing ports so that any defects in the ports, its conduits or instruments will show up. If the edges of the port 15 are dented or burred or worn, the read out will be different than what it should be and this will show up by a difference in the instrument reading. The ports 15 are angle sensing ports and if the port is damaged, the correct angle of fluid flow will not be sensed. Likewise, if one of the ports or its connecting line is plugged there would be no reading and if the line has a leak, it would also affect the reading. Once the checkout device itself has been calibrated for a particular intrument, the air flow out through the opening shown by arrows 36 will be at a predetermined angle with respect to the axis of probe portion 13. Then the ports should also give a predetermined reading so that the accuracy of the instrumentation of the unit can be determined. There is thus a very rapid means for checking out and calibrating the airdata sensor.

The housing 20 has a convenient handle member 40 attached thereto as at 41 and a switch 42 is provided for controlling power to the motor 21. A suitable electrical cord 43 is also provided and this will plug into the required power outlet.

In use, the handle 40 is used to hold the checkout device 10, the remote end of the duct is slipped onto the probe, the switch 42 is then pressed and the port positioned with its axis in the longitudinal plane bisecting the opening 33 will be checked. The instrument reading is checked to insure proper operation. Then the checkout unit is merely slid back from its stopped position to where the end of the tubular member 32 clears the strut 12, it is rotated 90°, moved to stop position in the next notch 35, and then the next port 15 is checked.

The use of the straightener vanes for the flow is of importance so that the flow is parallel to the axis of the tubular portion. When the flow comes to the probe (the probe plugs the remote end) the flow is deflected outwardly through the opening 33 at a predetermined, repeatable angle. Repeatability, of course, is the major criteria in any checkout device so that each time the unit is used the same performance will be achieved. The exact angle of flow is not of critical importance, as long as the angle of flow indicated by the arrows 36 past the probe is the same for each of the ports.

Likewise, the amount or volume of flow should be the same for each of the ports.

In FIGS. 7, 8 and 9 a modified form of the invention is shown wherein a modified tubular member 45 is mounted on the throat 24. The rest of the mechanism is exactly the same as before. The tubular member 45 has two outlet openings 46 and 47 on opposite sides of the tubular member. The outlet openings are both bisected by a common longitudinal plane and are 180° from each other. A plurality of stop notches 48 are also provided. In this form of the invention, the flow straighteners are used as before and all the other units function as before except that the air flow will be deflected out both of the openings 46 and 47 so that two of the ports 15 (the two ports have axes lying on a common plane) can be checked at once. Thus the checkout device is only used in two positions to check out all four of the ports 15.

The checkout device can also be used for determining whether the port 16 is plugged or leaking.

To check Pitot tubes, the unit will use stop means that permit it to be rotated 360° on the tube. Differences in readings during rotation would indicate a burr on the sensing port or a non-circular port.

It becomes apparent that the unit could be designed so that there were four outlet openings around the periphery of the tube and all four of the ports 15 could be checked at once on a probe if desired.

The checkout device can be used with all types of fluid data sensors and forms a portable source of fluid flow with predetermined stop positions so that the relationship of the air flow to the probe with which it is used is always the same, thereby insuring fast checking and repeatable results.

Openings 46 and 47 could be made different in size to simulate any preferred angle on the sensor. One of the openings could have a cover that could be adjustable to vary the opening size or completely block the opening to give more flexibility to the unit.

The unit is completely portable thus insuring that aircraft in operation can have their airdata sensors checked quickly and accurately while the plane stands right on the ramp. This means that there will be fewer casualties caused by malfunctioning of the instruments.

A high volume of fluid flow is necessary. The fluid flow can come from a gas generator or gas pump, such as those available on most aircraft pressurization systems.

What is claimed is:

1. A checkout device for a sensor having a fluid data sensing port comprising a first housing having a fluid passageway, an inlet opening provided in the housing and open to the passageway, an outlet opening provided in the housing and open to the passageway, means to provide a flow of fluid in the passageway from the inlet through the outlet opening, and guide and stop means on the housing of configuration to receive a portion of the sensor to position the sensor with the fluid data sensing port in the path of fluid flow, and at a preselected relationship to the fluid flow direction.

2. The combination as specified in claim 1 and a plurality of substantially flat vanes in the path of the fluid flow to cause said flow to remain substantially parallel to the passageway when passing from the inlet opening to the outlet opening of said first housing.

3. The combination as specified in claim 1 wherein said sensor has a plurality of ports located on the leading end surface thereof, and wherein said housing for said fluid data sensor has a plurality of stop means, each of said stop means being properly positioned to bring a particular port into proper relationship with the outlet opening of said housing.

4. The combination as specified in claim 2 wherein the means to provide fluid flow is comprised as a fan and means to mount said fan with respect to said first housing so that fluid flow from said fan is directed into the inlet opening of said first housing.

5. The combination as specified in claim 4 and a second housing open to the inlet of the first housing, said fan being mounted in the second housing, and said vanes are in said second housing between the fan and the inlet opening to said first housing.

6. The combination as specified in claim 5 and a transition throat member between the second housing and the inlet opening of the first housing, and means to space the throat member from the end surface of said second housing to provide a circumferential inlet to said throat member.

7. The combination as specified in claim 1 wherein the passageway has a longitudinal axis and wherein the axis of the port to be checked lies on a longitudinal plane bisecting the outlet opening when the sensor is engaging said stop means.

8. The combination as specified in claim 5 and a handle member attached to said second housing, said handle member being positioned at substantially right angles to the axis of the second housing, and a switch on said handle member in position to be actuated by a finger of a hand holding said handle, said switch controlling the operation of said fan.

9. A check out device for a sensor having a fluid data sensing port comprising a first tubular housing defining a fluid passageway, one end of said tube being open to define an inlet opening, an outlet opening defined in a side wall of said tube, means to provide a flow of fluid in the passageway from the inlet through the outlet opening, and stop means on the housing of configuration to receive a portion of the sensor and oriented to position the sensor with the fluid sensing port in a preselected relationship to the outlet opening and the fluid flow.

10. The combination as specified in claim 9 wherein the remote opening comprises the remote end of said tube and said sensor effectively plugs the remote opening when it is engaging said stop means.

11. The combination as specified in claim 9 wherein the first housing is a cylindrical tube.

12. The combination as specified in claim 9 wherein there are a plurality of outlet openings in said first housing positioned at predetermined locations around the periphery thereof.

13. The combination as specified in claim 10 wherein the sensor has a mounting strut extending at an acute angle to the portion thereof which is positioned in the remote end of said tube, and wherein said stop means is comprised as a notch defined in the remote end portion of said tube, said notch being of size to receive an edge portion of said strut.

References Cited

UNITED STATES PATENTS

| | | | |
|---|---|---|---|
| 1,375,482 | 4/1921 | Bartlett | 15—344 XR |
| 2,969,559 | 1/1961 | Landis | 15—344 XR |
| 3,089,331 | 5/1963 | Sharko et al. | 73—4 |
| 3,094,868 | 6/1963 | Andersen et al. | 73—182 XR |
| 3,243,990 | 4/1966 | Andersen | 73—4 |
| 3,263,482 | 8/1966 | Shank | 73—4 |

DAVID SCHONBERG, *Primary Examiner.*

LOUIS R. PRINCE, *Examiner.*

N. B. SIEGEL, *Assistant Examiner.*